Feb. 21, 1961 J. N. BEEBE 2,972,731
ECHO DISTANCE MEASURING SYSTEMS
Original Filed Oct. 16, 1948 2 Sheets-Sheet 1
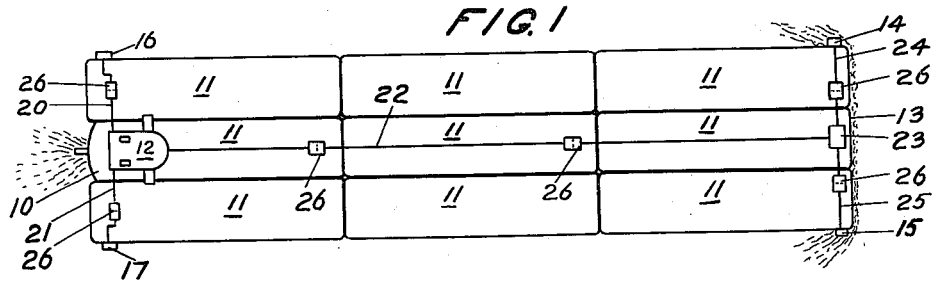
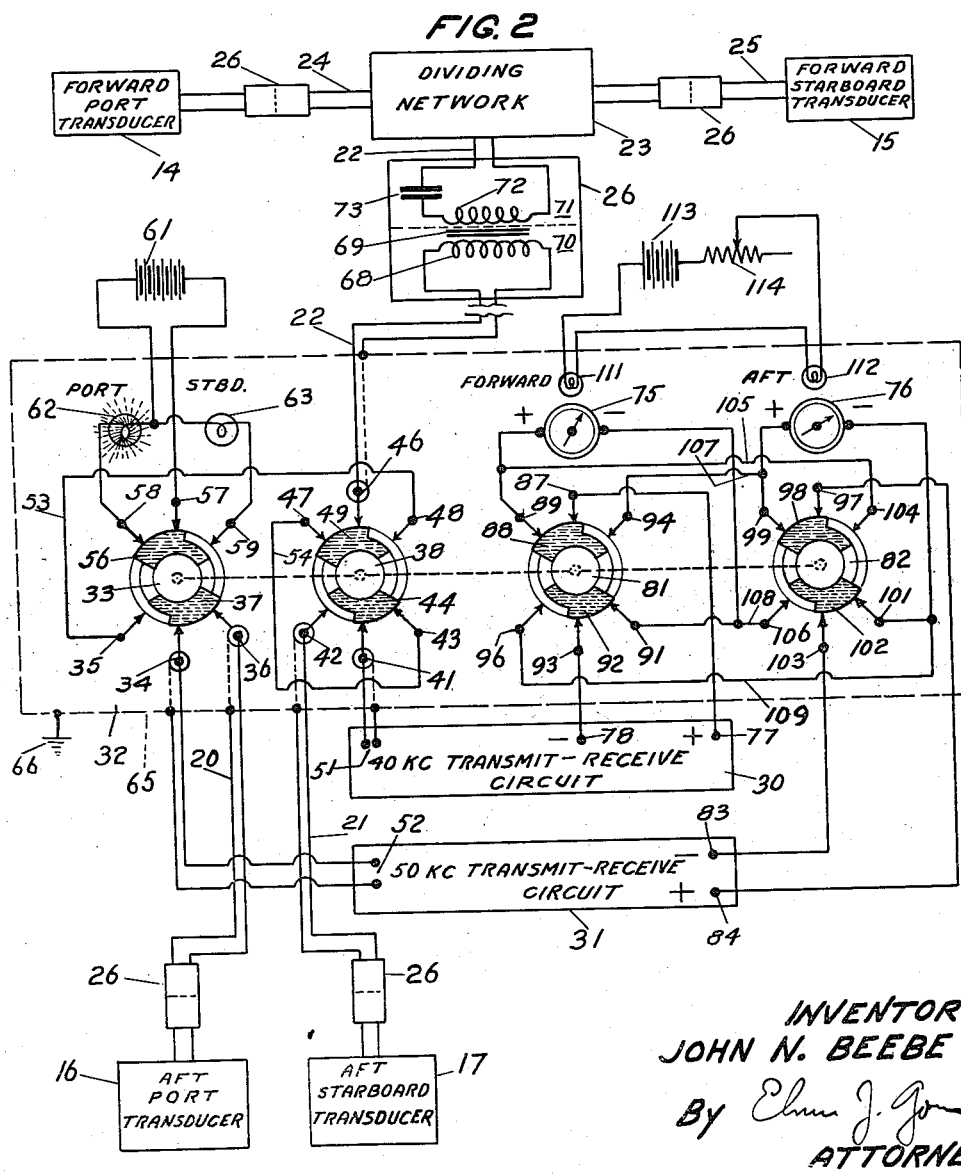
INVENTOR
JOHN N. BEEBE
ATTORNEY Feb. 21, 1961 J. N. BEEBE 2,972,731
ECHO DISTANCE MEASURING SYSTEMS
Original Filed Oct. 16, 1948 2 Sheets-Sheet 2
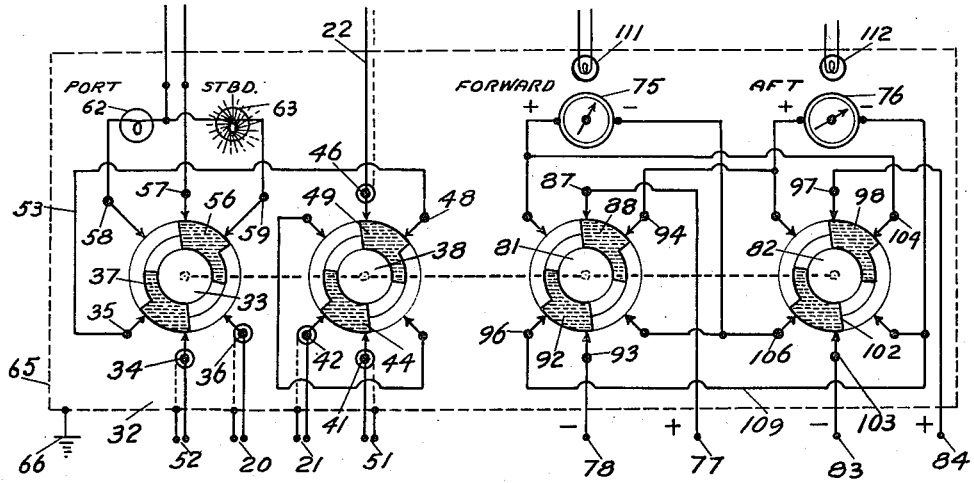
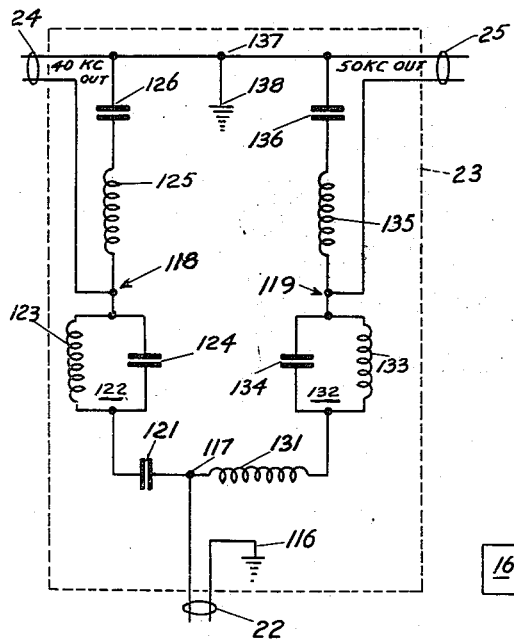
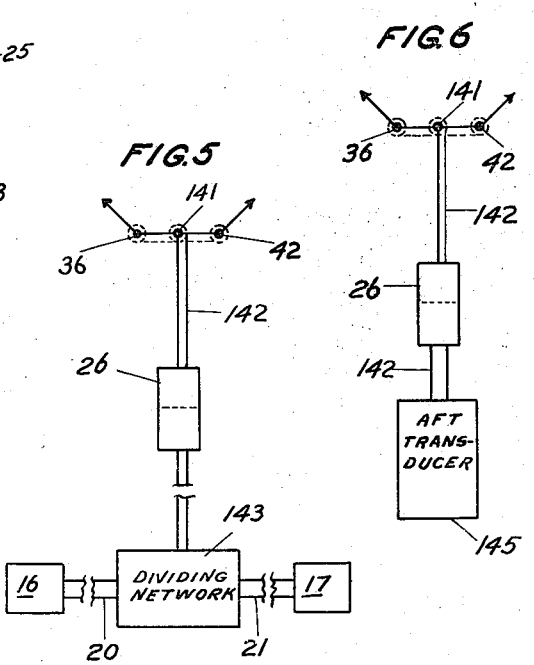
INVENTOR
JOHN N. BEEBE
BY Elmer J. Gorn
ATTORNEY

United States Patent Office 2,972,731
Patented Feb. 21, 1961

2,972,731
ECHO DISTANCE MEASURING SYSTEMS

John N. Beebe, Newton, Mass., assignor to Raytheon Company, a corporation of Delaware Continuation of application Ser. No. 54,851, Oct. 16, 1948. This application Sept. 13, 1949, Ser. No. 115,342

17 Claims. (Cl. 340—3)

This is a continuation of my copending application, Serial No. 54,851, filed October 16, 1948 (now abandoned).

The present invention relates to echo sounding systems for navigable vessels, and is particularly designed for use aboard barge tows of the kind used on the inland waterways.

The main object of this invention is to provide a versatile echo sounding system which will furnish information about the depth of water beneath any one of a number of chosen points on a navigable vessel.

It is another object to provide such a system which will selectively furnish a depth indication from any chosen one of such points.

It is a particular object of the invention to provide an echo sounding system which will furnish information about the depth of water beneath either side, port or starboard, forward on the bow, or aft at the stern of a complex barge tow.

It is a further object of the invention to provide such a system which is portable to the extent required for versatility of installation aboard barge tows which change in composition from one port of call to the other, at a minimum cost consistent with a high quality installation.

The present invention accomplishes the foregoing and other objects by providing separate transducers fore and aft, and on the port and starboard sides, on a vessel together with novel means for selectively energizing certain ones of them from echo sounding in chosen regions. The selection is accomplished with the aid of a frequency selective circuit to which signals of one or the other of two frequencies can be applied and which in turn provides a particular frequency to each of two transducers which are connected thereto. The invention further employs the frequency which is not applied to the selective circuit to energize still another transducer, so that soundings in two selected locations may be simultaneously had.

The foregoing and other objects of the invention will become more apparent from the following description of certain embodiments thereof, reference being had to the accompanying drawing wherein:

Fig. 1 diagrammatically illustrates a typical barge tow with the system of the present invention installed aboard;

Fig. 2 is an electrical schematic partly in block diagram form of the embodiment of the invention shown in one condition of operation;

Fig. 3 illustrates a second condition of operation of the embodiment of Fig. 2;

Fig. 4 is an electrical schematic of the dividing network of Fig. 2;

Fig. 5 illustrates a second embodiment of the invention; and

Fig. 6 illustrates a third embodiment of the invention.

Referring now to Fig. 1, a powered vessel 10 is shown pushing and pulling a group of barges 11. The barges 11 are fastened together one in front of the other at the bow end of the tow unit 10 until a substantial length, for example 1,000 feet, is reached. Additional barges 11 are then often fastened to the tow at the sides thereof. The navigator of the entire tow, who is stationed in the pilot house 12 of the tow unit 10, is faced constantly with the problem of knowing the depth of water beneath the tow. The information most needed is information about the depth of water at the forward end 13 of the tow, particularly at the port and starboard sides. It is advantageous also to have information about the depth of water at the aft end on both sides.

The system of the present invention contemplates the installation of echo sounding transducers 14, 15, 16 and 17 at the bow and stern of the barge tow, on the port and starboard sides thereof, so that depth information from these four most important points will be constantly available to the navigator. Because inland waterways, such as for example the Mississippi and Ohio Rivers, are rarely free of floating objects such as logs, it is preferred to place the forward transducers 14 and 15 of the system of the present invention just off the bow at the port and starboard sides, respectively. The water stream at these points usually carries floating objects away from the tow without injuring the transducers. Two additional transducers 16 and 17 are desirably installed aft at the port and starboard sides, respectively.

Electronic equipment of a kind to be described more particularly below is installed in the pilot house 12 for transmitting and receiving signals to and from selected ones of the transducers 14 to 17, inclusive. To carry these signals, signal connections 20 and 21 are provided from the aft transducers 16 and 17, respectively, to the pilot house 12, and a single cable 22 provides the signal connection to both forward transducers 14 and 15. By this feature, the present invention eliminates the cost of a long cable and its connecting devices. Cooperating with the cable 22 is a frequency dividing network 23 located forward and connected by signal connections 24 and 25 with the forward transducers 14 and 15, respectively. At each barge of the tow across which a signal connection 20, 21, 24 or 25 passes, there is located in the connection a two-piece cable connector 26 of a kind to be discussed more fully below. As will be appreciated from the description to follow, this system provides soundings of the depth of water at the most important points of the barge tow and enables continued navigation under the most adverse weather conditions.

Referring now to Fig. 2, a 40 kc. transmit-receive circuit 30 and a 50 kc. transmit-receive circuit 31 are located in the pilot house 12. As their names imply, the 40 kc. transmit-receive circuit is an electronic circuit which generates a pulse of 40 kc. energy to be furnished to a selected transducer, and at the same time generates a timing wave and is adapted, upon being provided with an echo of said pulse, to furnish a voltage which is measurably related to the time elapsing between the generation of the pulse and the reception of the echo. The 50 kc. circuit functions in the same manner but operates at a frequency of 50 kc. Circuits for accomplishing this function are known, and hence are not illustrated herein. As an example of a suitable circuit I prefer to use, I refer to the disclosure of pending application, Serial No. 749,426, filed May 21, 1947, now Patent No. 2,502,938, dated April 4, 1950.

Located also in the pilot house 12 is a four-bank control switch 32 shown surrounded by a dotted line box 65. The first bank 33 has a first main contact 34 and two selection contacts 35 and 36, respectively. A rotatable element 37 is dimensioned to make contact with the main contact 34 and one or the other of the selection contacts 35 and 36. The second bank 38 is constructed similarly to the first bank and has a first main contact 41 and first and second selection contacts 42 and 43, respectively, cooperating with a rotatable element 44 which is dimensioned to make contact with the main contact 41 and one or the other of the selection contacts 42 and 43. The second bank 38 has also a second main contact 46 and third and fourth selection contacts 47 and 48, respectively, cooperating with a second rotatable element 49 which is dimensioned to make contact with the second main contact 46 and one or the other of the third and fourth selection contacts 47 and 48. The first and second banks 33 and 38 of the switch 32 are ganged together so that in one position, rotatable element 37 is in contact with its main contact 34 and selection contact 36, at the same time that rotatable element 44 is in contact with its main contact 41 and selection contact 43 and rotatable element 49, is in contact with its main contact 46 and selection contact 47.

The 40 kc. transmit-receive circuit 30 is connected at its pulse output and input terminals 51 to the first main contact 41 of bank 38. The 50 kc. transmit-receive circuit 31 is connected at its pulse output and input terminals 52 to the main contact 34 of bank 33. The aft starboard transducer 17 is connected by the signal cable 21 to the first selection contact 42 of bank 38. The aft port transducer 16 is connected by the signal cable 20 to the second selection contact 36 of bank 33. The first selection contact 35 of bank 33 is directly connected by way of a wire 53 to the fourth selection contact 48 of bank 38. The third selection contact 47 of bank 38 is connected by a wire 54 to the second selection contact 43 of the same bank. The second main contact 46 of bank 38 is connected to the cable 22 which leads forward to the dividing network 23 and thence to the forward transducers 14 and 15.

With the switch 32 in the position shown, a circuit can be traced from the 40 kc. transmit-receive circuit 30 through the first main contact 41, and second and third selection contacts 43 and 47 and the second main contact 46 of bank 38 to the cable 22 leading forward. This provides the 40 kc. signal to the dividing network 23. As will be explained in detail below, the dividing network passes the 40 kc. signal to the forward port transducer 14, and no 40 kc. signal is passed to the starboard transducer 15. At the same time, a circuit can be traced from the 50 kc. transmit-receive circuit 31 via the first main contact 34, and second selection contact 36 of the first bank 33 to the aft port transducer 16. Thus with the switch 32 in the position shown, the forward port transducer 14 is operated with 40 kc. energy, and the aft port transducer 16 is operated with 50 kc. energy.

Referring now to Fig. 3, the switch 32 is shown in a second position which is arrived at by rotating the ganged switch banks 33 and 38 in a clockwise direction so that the rotatable element 37 of bank 33 now connects main contact 34 with the first selection contact 35, and the first rotatable element 44 of bank 38 now connects the first main contact 41 with the first selection contact 42, while the second rotatable element 49 of bank 38 now connects the second main contact 46 with the fourth selection contact 48. A circuit can now be traced from the pulse terminals 51 of the 40 kc. circuit 30 through the first main contact 41 and first selection contact 42 of bank 38 to cable 21, and thence to the aft starboard transducer 17. A second circuit can now be traced from the pulse terminals 52 of the 50 kc. circuit 31 through the main contact 34 and first selection contact 35 of bank 33 to the fourth selection contact 48 of bank 38 via wire 53, and then to the second main contact 46 of bank 38 to cable 22 which carries the 50 kc. signal forward to the dividing network 23. The dividing network 23, as will be explained below, passes the 50 kc. signal to the starboard transducer 15, and no 50 kc. signal is passed to the port transducer 14. The 40 kc. signal is provided to the aft starboard transducer 17. Thus with the switch 32 in its second position, soundings are made on the starboard side of the tow. It will be convenient to refer to the first position of switch 32 as the port position and the second position thereof as the starboard position.

A means of indicating the position of the switch 32 in a darkened pilot house may be provided employing a second rotatable member 56 of the first bank 33 and its cooperating main and first and second selection contacts 57, 58 and 59, respectively. A battery 61 is connected at one terminal to the main contact 57. A first lamp 62 is connected at one side to the first selection contact 58. A second lamp 63 is connected at one side to the second selection contact 59. The remaining sides of the lamps are connected together to the remaining side of the battery 61. As can be seen from Figs. 2 and 3, the first lamp 62 is connected in circuit with the battery 61 when the switch 32 is in the port position, and the second lamp 63 is connected in circuit with the battery 61 when the switch 32 is in the starboard position, the first lamp 62 then being disconnected. The lamps 62 and 63 are conveniently labelled port and starboard pilot lights.

The cables 20, 21, 22, 24 and 25 are two-conductor cables. However, within the casing 65 of the switch 32 a shielded single conductor is connected to the appropriate contact of the switch. The casing 65, which is electrically conductive, is grounded as at 66, and one conductor of each signal cable is electrically connected thereto.

The coupling units 26 are each a two-piece transformer of which the primary and secondary windings are physically separable. The electrical nature of these coupling units is schematically illustrated in the unit connected in cable 22. The primary winding 68 is connected to the pilot house end of the cable 22. Together with an iron core 69, this winding is contained in one half 70 of the coupling unit. The other half 71 of the coupling unit contains a secondary winding 72 and in series therewith a condenser 73 which is intended to tune out at least part of the leakage reactance of the coupling unit. The second half 71 of the coupling unit is connected to the dividing network side of the cable 22. I prefer to employ coupling units of having the physical structure shown and described in my co-pending application, Serial No. 13,312, filed March 5, 1948. These coupling units are physically strong and readily separable without the generation of sparks and hence safe to use aboard barges carrying inflammable materials.

Each of the transmit-receive circuits 30 and 31 is provided with a means for indicating the depth being measured. In the present embodiment, the indicators are of the meter type, and two separate meters 75 and 76 are provided, each of which can be operated selectively from one or the other of the transmit-receive circuits, in accordance with the setting, port or starboard, of the control switch 32. The first meter 75 indicates depth forward and is so labelled, while the second meter 76 indicates depth aft and is likewise so labelled. When the control switch 32 is in the port position, the forward meter 75 is connected to the output terminals 77 and 78 of the 40 kc. transmit-receive circuit 30 through a third bank 81 of the control switch 32. Simultaneously, the second or aft meter 76 is connected to the output terminals 83 and 84 of the 50 kc. transmit-receive circuit 31 through a fourth bank 82 of the control switch 32. The third and fourth banks 81 and 82 are ganged with the first and second banks 31 and 38 of the control switch 32. A single dashed line 85 linking all four banks indicates this ganging. The meter circuit of the forward meter can be traced from the positive terminal 77 of the 40 kc. transmit-receive circuit 30 to a first main contact 87 of the third bank 81, then through the rotatable element 88 and first selection contact 89 thereof, then through the forward meter 75 to the third selection contact 91 of the third bank 81, then through the second rotatable element 92 and second main contact 93 thereof to the negative terminal 78 of said transmit-receive circuit. A similar circuit can be traced for the aft meter, starting with the positive output terminal 84 of the 50 kc. transmit-receive circuit 31. This meter circuit is traced to the first main contact 97 of the fourth bank 82, then through the first rotatable element 98 and first selection contact 99 thereof to the positive terminal of the aft meter 76, from the negative terminal of the aft meter 76 to the third selection contact 101, second rotatable contact 102 and second main contact 103 of the fourth bank 82, and thence to the negative output terminal 83 of said 50 kc. circuit. There are provided the following direct connections from the third bank 81 to the fourth bank 82:

A connection 105 from first selection contact 89 to second selection contact 104;

A connection 107 from second selection contact 94 to first selection contact 99;

A connection 108 from third selection contact 91 to fourth selection contact 106; and A connection 109 from fourth selection contact 96 to third selection contact 101.

These direct connections are employed when the control switch 32 is shifted from the port to the starboard position as shown in Fig. 3. In the starboard position, the circuit of the aft meter 76 is traced from the positive output terminal 77 of the 40 kc. transmit-receive circuit 30 to the first main contact 87 of the third bank 81, then through the first rotatable member 88 and second selection contact 94 thereof to the positive terminal of the meter 76, then from the negative terminal of said meter through direct connection 109 to the fourth selection contact 96 of the third bank 81, then through the second rotatable member 92 and second main contact 93 thereof to the negative terminal 78 of said 40 kc. circuit. Similarly the circuit of the forward meter 75 can be traced from the positive terminal 84 of the 50 kc. transmit-receive circuit 31 to the first main contact 97 of the fourth bank 82, then through the first rotatable member 98 and second selection contact 104 thereof to the positive terminal of the meter 75, then from the negative terminal of said meter to the fourth selection contact 106 of the fourth bank 82, then through second rotatable member 102 and the second main contact 103 thereof to the negative terminal 83 of said 50 kc. transmit-receive circuit.

Thus it can be seen that when the control switch 32 is in the port position, the 40 kc. transmit-receive circuit furnishes energy forward, and the forward meter 75 is simultaneously connected thereto, while the 50 kc. transmit-receive circuit furnishes energy aft, and the aft meter 76 is simultaneously connected thereto; and when the control switch 32 is in the starboard position, the 50 kc. transmit-receive circuit furnishes energy forward, and the forward meter 75 is connected thereto, while simultaneously the 40 kc. transmit-receive circuit furnishes energy aft and the aft meter 76 is connected thereto. With this system therefore, the navigator is able to choose soundings from either side, port or starboard, and will obtain information about the depth both forward and aft on the chosen side.

Indicator lights 111 and 112 may be provided if desired for the forward and aft meters 75 and 76, respectively. When these lights are provided, a suitable source of power, such as a battery 113, is necessary, and a dimming control, for example a rheostat 114 in series therewith, is desirable.

Referring to Fig. 4, the circuit of the dividing network 23 is there illustrated. The single cable 22 running between the pilot house 12 and the dividing network is brought in at the bottom of the figure where one conductor is grounded at 116 and the second conductor is connected at a terminal 117 to two parallel branches 118 and 119 of the circuit. The first parallel branch 118 has in series a capacitor 121, a parallel resonance circuit 122 consisting of an inductor 123, and a second capacitor 124 connected in parallel with respect to each other, a second inductor 125 and a third capacitor 126. The second branch 119 of the network circuit has in series an inductor 131, a parallel resonance circuit 132 having a second inductor 133 and a capacitor 134 connected in parallel with respect to each other, a third inductor 135 and a second capacitor 136. The two parallel branches 118 and 119 are brought together at the upper ends to a terminal 137 which is grounded as at 138. The 40 kc. output, which is provided to the signal connection 24 to the port transducer 14, is taken across the second inductor 125 and third capacitor 126 of the first branch 118. The 50 kc. output, which is provided to the signal connection 25 to the starboard transducer 15, is taken across the third inductor 135 and second capacitor 136 of the second branch 119.

The circuit of the dividing network 23 functions in the manner of a band rejection filter. In the first branch 118, the parallel resonance circuit 122 is resonant to 50 kc. per second and hence introduces substantially infinite impedance in this branch to 50 kc. signals while permitting 40 kc. signals to pass. On the other hand, the series arrangement of the second inductor 125 and third capacitor 126 of the first branch 118 is not resonant to 40 kc. per second, so that a substantial voltage can be developed thereacross for the 40 kc. signal. In a similar fashion, the parallel resonance circuit 132 of the second branch 119 is resonant to 40 kc. per second while the series arrangement including the third inductor 135 and the second capacitor 136 of this branch is not resonant to 50 kc. per second. Thus in the second branch 119 there is substantially infinite impedance to 40 kc. signals, while 50 kc. signals are passed and develop a signal voltage in the third inductor 135 and second capacitor 136.

Suitable values for the various circuit elements shown in Fig. 4 are as follows:

| | | |
|---|---|---|
| Capacitor 121 | µf | 0.06 |
| Capacitor 124 | µf | 0.1 |
| Capacitor 126 | µf | 0.005 |
| Inductor 123 | µh | 105 |
| Inductor 125 | mh | 2.05 |
| Capacitor 134 | µf | 0.1 |
| Capacitor 136 | µf | 0.007 |
| Inductor 131 | µh | 280 |
| Inductor 133 | µh | 165 |
| Inductor 135 | mh | 2.32 |

When the control station 32 is not only a substantial distance from the forward transducers 14 and 15, but also a substantial distance from the aft transducers 16 and 17, the arrangement shown in Fig. 5 may be employed to advantage. In this arrangement, the second selection terminal 36 of the first switch bank 33 and the first selection terminal 42 of the second switch bank 38 are connected together, for example to a common terminal 141. A single cable 142 runs aft from this common terminal to a second dividing network 143 which is similar in all main respects to the forward dividing network 23. Magnetic connectors 26 are included in this cable as suitable. The signal connections 20 and 21 of the port and starboard aft transducers 16 and 17, respectively, are brought into the aft dividing network 143. Recalling that the forward dividing network 23 sends 40 kc. signals to the port side and 50 kc. signals to the starboard side, it will be appreciated that the aft dividing network 143 should be arranged to send 50 kc. signals to the port side and 40 kc. signals to the starboard side.

In some installations it may be desired to employ only one aft transducer, for example there may be no barges 11 secured to the tow unit 10 itself. In such installations, as shown in Fig. 6, the aft dividing network 143 and the port and starboard aft transducers are omitted, and a single transducer 145 is connected to the common terminal 141 by way of a suitable length of cable 142.

Since other modifications of the invention, not herein illustrated, will occur to those skilled in the art, it is intended that the claims that follow shall not be limited by the details of the various embodiments described herein but only by the prior art.

What is claimed is:

1. An echo sounding system comprising first transmitting and receiving means adapted for operation at a first frequency, second transmitting and receiving means adapted for operation at a second frequency, first and second electroacoustic transducers disposed in first and second locations where soundings are to be taken, remote from said transmitting and receiving means, switch means having a main and first and second selection contacts on either one of which said main contact can be selectively closed, a dividing network having three terminal means of which the first is substantially impassable to said first frequency, the second is substantially impassable to said second frequency, and the third passes both of said frequencies, means connecting said first transmitting and receiving means to said first selection contact, means connecting said second transmitting and receiving means to said second selection contact, means connecting said main contact to said third terminal means, means connecting said first transducer to said first terminal means, and means connecting said second transducer to said second terminal means.

2. An echo sounding system comprising first transmitting and receiving means adapted for operation at a first frequency, second transmitting and receiving means adapted for operation at a second frequency, first and second electroacoustic transducers disposed in first and second locations where soundings are to be taken, remote from said transmitting and receiving means, switch means having a main and first and second selection contacts on either one of which said main contact can be selectively closed, a dividing network having three terminal means of which the first is substantially impassable to said first frequency, the second is substantially impassable to said second frequency, and the third passes both of said frequencies, means connecting said first transmitting and receiving means to said first selection contact, means connecting said second transmitting and receiving means to said second selection contact, means connecting said main contact to said third terminal means, means connecting said first transducer to said first terminal means, means connecting said second transducer to said second terminal means, depth indicating means, and means for selectively connecting said indicating means to the one of said transmitting and receiving means that is connected to said third terminal means through said switch means.

3. An echo sounding system comprising first transmitting and receiving means adapted for operation at a first frequency, second transmitting and receiving means adapted for operation at a second frequency, first and second electroacoustic transducers disposed in first and second locations where soundings are to be taken, remote from said transmitting and receiving means, first switch means having first main and first and second selection contacts on either one of which said first main contact can be selectively closed, a dividing network having three terminal means of which the first is substantially impassable to said first frequency, the second is substantially impassable to said second frequency, and the third passes both of said frequencies, means connecting said main contact to said third terminal means, means connecting said first transducer to said first terminal means, means connecting said second transducer to said second terminal means, second switch means having second main and third and fourth selection contacts on either one of which said second main contact can be selectively closed, means connecting said first transmitting and receiving means to said second main contact, means connecting said first and third selection contacts together, third switch means having third main and fifth and sixth selection contacts on either one of which said third main contact can be selectively closed, means connecting said second transmitting and receiving means to said third main contact, means connecting said second and sixth selection contacts together, and additional transducer means connected to said fourth and fifth selection contacts.

4. An echo sounding system comprising first transmitting and receiving means adapted for operation at a first frequency, second transmitting and receiving means adapted for operation at a second frequency, first and second electroacoustic transducers disposed in first and second locations where soundings are to be taken, remote from said transmitting and receiving means, first switch means having first main and first and second selection contacts on either one of which said first main contact can be selectively closed, a dividing network having three terminal means of which the first is substantially impassable to said first frequency, the second is substantially impassable to said second frequency, and the third passes both of said frequencies, means connecting said main contact to said third terminal means, means connecting said first transducer to said first terminal means, means connecting said second transducer to said second terminal means, second switch means having second main and third and fourth selection contacts on either one of which said second main contact can be selectively closed, means connecting said first transmitting and receiving means to said second main contact, means connecting said first and third selection contacts together, third swich means having third main and fifth and sixth selection contacts on either one of which said third main contact can be selectively closed, means connecting said second transmitting and receiving means to said third main contact, means connecting said second and sixth selection contacts together, and additional transducer means connected to said fourth and fifth selection contacts, said first, second, and third switch means being ganged together so that in one operative position said first, second, and third main contacts are closed on said first, third and fifth selection contacts, respectively, and in another operative position on said second, fourth, and sixth selection contacts, respectively.

5. An echo sounding system comprising first transmitting and receiving means adapted for operation at a first frequency, second transmitting and receiving means adapted for operation at a second frequency, first and second electroacoustic transducers disposed in first and second locations where soundings are to be taken, remote from said transmitting and receiving means, first switch means having first main and first and second selection contacts on either one of which said first main contact can be selectively closed, a dividing network having three terminal means of which the first is substantially impassable to said first frequency, the second is substantially impassable to said second frequency, and the third passes both of said frequencies, means connecting said main contact to said third terminal means, means connecting said first transducer to said first terminal means, means connecting said second transducer to said second terminal means, second switch means having second main and third and fourth selection contacts on either one of which said second main contact can be selectively closed, means connecting said first transmitting and receiving means to said second main contact, means connecting said first and third selection contacts together, third switch means having third main and fifth and sixth selection contacts on either one of which said third main contact can be selectively closed, means connecting said second transmitting and receiving means to said third main contact, means connecting said second and sixth selection contacts together, a third electroacoustic transducer disposed in a third location where soundings are to be taken, and means connecting said third transducer to said fourth and fifth selection contacts in common.

6. An echo sounding system comprising first transmitting and receiving means adapted for operation at a first frequency, second transmitting and receiving means adapted for operation at a second frequency, first and second electroacoustic transducers disposed in first and second locations where soundings are to be taken, remote from said transmitting and receiving means, first switch means having first main and first and second selection contacts on either one of which said first main contact can be selectively closed, a dividing network having three terminal means of which the first is substantially impassable to said first frequency, the second is substantially impassable to said second frequency, and the third passes both of said frequencies, means connecting said main contact to said third terminal means, means connecting said first transducer to said first terminal means, means connecting said second transducer to said second terminal means, second switch means having second main and third and fourth selection contacts on either one of which said second main contact can be selectively closed, means connecting said first transmitting and receiving means to said second main contact, means connecting said first and third selection contacts together, third switch means having third main and fifth and sixth selection contacts on either one of which said third main contact can be selectively closed, means connecting said second transmitting and receiving means to said third main contact, means connecting said second and sixth selection contacts together, third and fourth electroacoustic transducers disposed in third and fourth locations where soundings are to be taken, a second dividing network having fourth, fifth, and sixth terminal means of which said fourth terminal means is substantially impassable to said first frequency, said fifth is substantially impassible to said second frequency, and said sixth passes both of said frequencies, means connecting said fourth and fifth contacts in common to said sixth terminal means, means connecting said third transducer to said fourth terminal means, and means connecting said fourth transducer to said fifth terminal means.

7. An echo sounding system comprising first transmitting and receiving means adapted for operation at a first frequency, second transmitting and receiving means adapted for operation at a second frequency, first and second electroacoustic transducers disposed in first and second locations where soundings are to be taken, remote from said transmitting and receiving means, first switch means having first main and first and second selection contacts on either one of which said first main contact can be selectively closed, a dividing network having three terminal means of which the first is substantially impassable to said first frequency, the second is substantially impassable to said second frequency, and the third passes both of said frequencies, means connecting said main contact to said third terminal means, means connecting said first transducer to said first terminal means, means connecting said second transducer to said second terminal means, third and fourth electroacoustic transducers disposed in third and fourth locations where soundings are to be taken, second switch means having second main and third and fourth selection contacts on either one of which said second main contact can be selectively closed, means connecting said first transmitting and receiving means to said second main contact, means connecting said first and third selection contacts together, means connecting said third transducer to said fourth selection contact, third switch means having third main and fifth and sixth selection contacts on either one of which said third main contact can be selectively closed, means connecting said second transmitting and receiving means to said third main contact, means connecting said second and sixth selection contacts together, and means connecting said fourth transducer to said fifth selection contact.

8. An echo sounding system for use aboard navigable vessels comprising a port-side electroacoustic transducer, a starboardside electroacoustic transducer, first transmitting and receiving means adapted for operation at a first frequency, second transmitting and receiving means adapted for operation at a second frequency, a control station located a considerable distance from said transducers, a frequency selective dividing network located near said transducers, a single signal cable connected between said station and said network, separate signal connections between said network and each of said transducers, signal connections between each of said transmitting and receiving means and said station, and switch means at said station for selectively connecting one or the other of said transmitting and receiving means to said single cable, said network being dimensioned to pass said first frequency to one of said transducers and said second frequency to the other of said transducers.

9. An echo sounding system for use aboard a navigable vessel comprising a port-side electroacoustic transducer, a starboard-side electroacoustic transducer, both located forward on said vessel, first transmitting and receiving means adapted for operation at a first frequency, second transmitting and receiving means adapted for operation at a second frequency, a control station located a considerable distance from said transducers, a frequency selective dividing network located near said transducers, a single signal cable connected between said station and said network, separate signal connections between said network and each of said transducers, signal connections between each of said transmitting and receiving means and said station, aft-located electroacoustic transducer means, signal connection means between said after transducer means and said station and switch means having two operative positions for port and starboard forward sounding respectively, said switch means being adapted when in said port position to connect said first transmitting and receiving means to said cable and said second transmitting and receiving means to said signal connection means, and when in said starboard position to reverse said connections, said network being dimensioned to pass said first frequency to one of said forward transducers and said second frequency to the other of said forward transducers.

10. An echo sounding system for use aboard a naviable vessel comprising a port-side electroacoustic transducer, a starboard-side electroacoustic transducer, both located forward on said vessel, first transmitting and receiving means adapted for operation at a first frequency, second transmitting and receiving means adapted for operation at a second frequency, a control station located a considerable distance from said transducers, a frequency selective dividing network located near said transducers, a single signal cable connected between said station and said network, separate signal connections between said network and each of said transducers, signal connection between each of said transmitting and receiving means and said station, aft-located electroacoustic transducer means, signal connection means between said after transducer means and said station and switch means having two operative positions for port and starboard forward sounding respectively, said switch means being adapted when in said port position to connect said first transmitting and receiving means to said cable and said second transmitting and receiving means to said signal connection means, and when in said starboard position to reverse said connections, said network being dimensioned to pass said first frequency to one of said forward transducers and said second frequency to the other of said forward transducers, first and second depth indicating means, for forward and aft depth indications, respectively, further switch means at said station adapted to connect said first indicating means to the output of the transmitting and receiving means which is connected to said cable and said second indicating means to the output of the other transmitting and receiving means.

11. An echo sounding system for use aboard a navigable vessel comprising a port-side electroacoustic transducer, a starboard-side electroacoustic transducer, both located forward on said vessel, first transmitting and receiving means adapted for operation at a first frequency, second transmitting and receiving means adapted for operation at a second frequency, a control station located a considerable distance from said transducers, a frequency selective dividing network located near said transducers, a single signal cable connected between said station and said network, separate signal connections between said network and each of said transducers, signal connections between each of said transmitting and receiving means and said station, aft-located electroacoustic transducer means, signal connection means between said after transducer means and said station and switch means having two operative positions for port and starboard forward sounding respectively, said switch means being adapted when in said port position to connect said first transmitting and receiving means to said cable and said second transmitting and receiving means to said signal connection means, and when in said starboard position to reverse said connections, said network being dimensioned to pass said first frequency to one of said forward transducers and said second frequency to the other of said forward transducers, first and second depth indicating means, for forward and aft depth indications, respectively, further switch means at said station adapted to connect said first indicating means to the output of the transmitting and receiving means which is connected to said cable and said second indicating means to the output of the other transmitting and receiving means, said switch means being all ganged for common operation from a single control.

12. An echo sounding system for use aboard a navigable vessel comprising first, second, third, and fourth electroacoustic transducers located respectively forward on the port and starboard sides and aft on the port and starboard sides, first and second transmitting and receiving means adapted for operation at first and second frequencies, respectively, a control station located a considerable distance from said first and second transducers, a frequency selective dividing network located forward near said first and second transducers, a single signal cable connected between said station and said dividing network, first and second signal connections between said network and said first and second transducers, respectively, third and fourth signal connections between said station and said third and fourth transducers, respectively, and switch means at said station having two operative positions for port and starboard sounding, respectively, said switch means being adapted when in said port position to connect said first transmitting and receiving means to said cable and said second transmitting and receiving means to said third transducer, and when in said starboard position to connect said second transmitting and receiving means to said cable and said first transmitting means to said fourth transducer, said dividing network being dimensioned to pass said first frequency to the port transducer and said second frequency to the starboard transducer.

13. An echo sounding system for use aboard a navigable vessel comprising first, second, third, and fourth electroacoustic transducers located respectively forward on the port and starboard sides and aft on the port and starboard sides, first and second transmitting and receiving means adapted for operation at first and second frequencies, respectively, a control station located a considerable distance from said transducers, a first frequency selective dividing network located forward near said first and second transducers, first and second signal connections between said first network and said first and second transducers, respectively, a first signal cable between said first network and said control station, a second frequency selective dividing network located aft near said third and fourth transducers, third and fourth signal connections between said second network and said third and fourth transducers, respectively, a second signal cable between said second network and said control station, and switch means at said station having two operative positions for port and starboard sounding, respectively, said switch means being adapted when in said port position to connect said first and second transmitting and receiving means to said first and second cable, respectively, and when in said starboard position to reverse said connections, said first dividing network being dimensioned to pass said first frequency to said first transducer and said second frequency to said second transducer, and said second dividing network being dimensioned to pass said second frequency to said third transducer and said first frequency to said fourth transducer.

14. A signal transmitting-and-receiving system comprising first and second signaling transducers located respectively in first and second separate regions, first and second separate transmitting and receiving means adapted for operation at first and second frequencies, respectively, a frequency dividing network, switch means connected between said transmitting and receiving means and said network and arranged selectively to provide a signal of one or the other of said transmitting-and-receiving means to said network, and separate signal connections between said network and each of said transducers, said network being dimensioned to pass said first frequency to one of said transducers and said second frequency to the other of said transducers.

15. A signal transmitting-and-receiving system employing two separate signaling transducers located respectively in first and second separate regions for distance finding in different regions, means for choosing one or the other of said transducers comprising first and second separate transmitting-and-receving means providing transducer energizing signals of two different frequencies, a frequency dividing network, means selectively connecting a signal of one or the other of said transmitting-and-receiving means to said network, and separate signal connections from said network to each transducer, said network being dimensioned to pass one of said frequencies to one of said connections and the other frequency to the other connection.

16. A signal transmitting-and-receiving system comprising first and second signaling transducers located respectively in first and second separate regions, first and second separate transmitting-and-receiving circuits remotely located with respect to said transducers and adapted to provide energizing signals for said transducers at first and second frequencies, respectively, a frequency dividing network located near said transducers and having input terminal means arranged to accept said signals, first output terminal means which passes said first but not said second frequency and second output terminal means which passes said second but not said first frequency, a single signal transmission means arranged to bring said signals to said input terminal means, a switch in said single transmission means arranged to connect one or the other of said transmitting-and-receiving circuits thereto, means connecting said first transducer to said first output terminal means, and means connecting said second transducer to said second output terminal means.

17. A signal transmitting-and-receiving system comprising first and second signaling transducers located respectively in first and second separate regions, first and second separate transmitting-and-receiving circuits adapted to provide energizing signals for said transducers at first and second frequencies, respectively, signal switching means having a first input connected to said first transmitting-and-receiving circuit to accept signals of said first frequency, a second input connected to said second transmitting-and-receiving circuit to accept signals of said second frequency, and a signal output to which one or othe other of said frequencies is provided, a frequency dividing network having input terminal means arranged to accept said signals, first output terminal means which passes said first but not said second frequency and second output terminal means which passes said second but not said first frequency, means connecting said first transducer to said first output terminal means, means connecting said second transducer to said second output terminal means, and means connecting said signal output to said input terminal means.

References Cited in the file of this patent

UNITED STATES PATENTS

| | | |
|---|---|---|
| 1,816,579 | Hammond | July 28, 1931 |
| 2,036,187 | Chromy | Apr. 7, 1936 |
| 2,039,405 | Green et al. | May 5, 1939 |
| 2,144,215 | Beverage | Jan. 17, 1939 |
| 2,418,156 | Bollman | Apr. 1, 1947 |
| 2,467,400 | Murray | Apr. 19, 1949 |
| 2,527,547 | Hardy | Oct. 31, 1950 |